Patented Dec. 23, 1924.

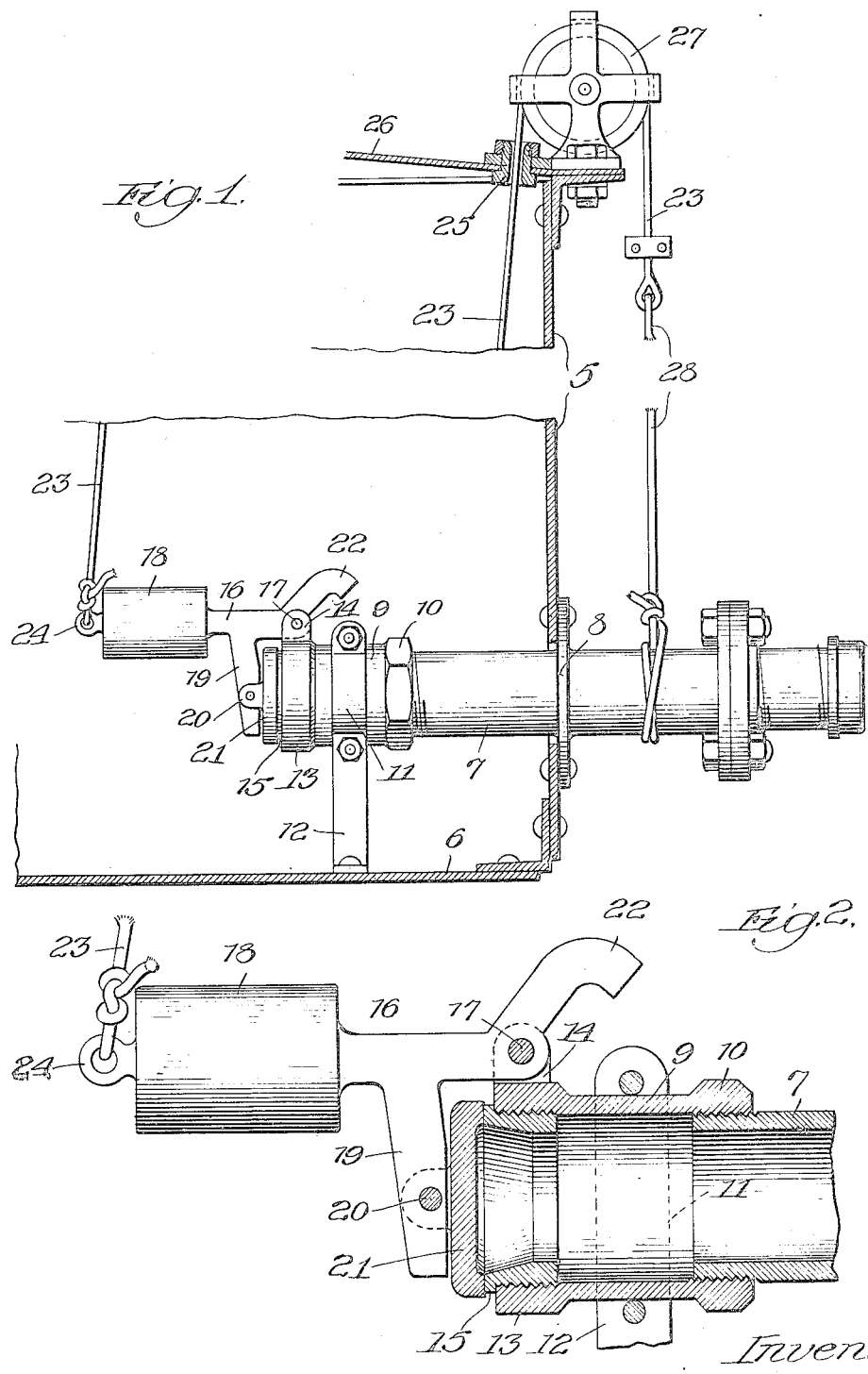

1,520,490

UNITED STATES PATENT OFFICE.

GEORGE W. WATTS, OF WHITING, INDIANA, ASSIGNOR TO STANDARD OIL COMPANY, OF WHITING, INDIANA, A CORPORATION OF INDIANA.

AUTOMATIC CHECK VALVE FOR STORAGE TANKS.

Application filed August 4, 1923. Serial No. 655,641.

*To all whom it may concern:*

Be it known that I, GEORGE W. WATTS, a citizen of the United States, residing at Whiting, in the county of Lake and State of Indiana, have invented new and useful Improvements in Automatic Check Valves for Storage Tanks, of which the following is a specification.

The present invention relates to improvements in automatic check valves for use in storage tanks, and will be fully understood from the following description, illustrated by the accompanying drawing, in which:

Figure 1 shows a device embodying the invention and shown in side elevation, and Fig. 2 is a detail sectional view of the device shown in Fig. 1.

Referring more particularly to the drawing, the numeral 5 indicates in broken section the wall of the tank and the numeral 6 the bottom. Through a suitable opening in the wall 5 near the bottom of the tank a pipe 7 enters, this pipe being provided with a flange 8 riveted to the wall 5 of the tank and preferably caulked. To the end of the pipe 7 is screwed the body 9 of the valve proper, a portion of the valve body being given a hexagonal or other polygonal section, as indicated at 10. Suitable supporting means are provided, for example, a clamping yoke 11 supported on a standard 12 welded to the bottom 6 of the tank. The end of the valve body is somewhat enlarged, as at 13, and a pivot yoke 14 is formed integrally therewith. A valve seat 15, preferably of Monel metal, is screwed into the enlarged end 13 of the valve body 9. A lever 16 is fulcrumed in the pivot yoke 14 by means of the pivot pin 17, the lever 16 being weighted by any suitable means, for example, an integral enlarged portion 18. A downwardly depending arm 19 of the lever 16 carries on a pivotal mount 20 a valve head 21, which normally bears against the valve seat 15. The lever 16 is likewise provided with a rearwardly and angularly directed projection 22, which engages the valve body and acts as a stop when the lever is raised to open the valve.

The screw-threaded connection between the pipe 7 and the body 9 of the valve proper, as shown in Figure 2 of the drawing, permits of an adjustment between these parts whereby to properly locate the valve in the tank and with reference to the clamping yoke 11 carried by the standard 12 and which latter is, as stated, welded to the bottom 6 of the tank.

To open the valve for out-flow of liquid a flexible wire rope or stay 23 may be attached to an eye 24 on the end of the lever 16, the rope or stay 23 passing through a guide 25 inserted in the side or roof 26 of the tank, then over an exterior pulley 27 and being secured, for example, by means of a rope 28 or other suitable device readily destroyed by excessive heat or fire, to the external portion of the pipe 7. It is readily apparent that other equivalent means such as a fusible link may be substituted for this rope. This heat destructible securing means is in proximity to the outlet for the oil, whereby, in case of ignition of the latter during out-flow of the oil; that is, during the period in which the valve is in open position, the connecting means is promptly destroyed, the valve closes and the egress of the oil stops.

I claim:

1. In combination with a storage tank, a rigidly-mounted member in said tank having an elevated support, a discharge-pipe passing through the tank-wall, a valve-body attached to the pipe and carried by said support, said body being adjustable on the pipe to properly cooperate with said support, and a valve for the valve-body.

2. In combination with a storage tank, a permanently mounted member in said tank having an elevated support, a discharge-pipe passing through the tank-wall, a valve-body attached to the pipe and carried by said support, said body being adjustable on the pipe to properly cooperate with said support, and a valve for the valve-body.

3. In combination with a storage tank, a permanently mounted member in said tank having an elevated support, a discharge-pipe passing through the tank-wall, a valve-body attached to the pipe and carried by said support, said body being adjustable on the pipe to properly cooperate with said support, and a valve-seat having threaded connection with the valve-body.

4. In combination with a storage tank, a permanently mounted member in said tank having an elevated support, a discharge-pipe passing through the tank-wall, a valve-body attached to the pipe and carried by said support, said body being adjustable on the pipe to properly cooperate with said support, a valve-seat having a threaded connection with the valve-body, a valve-head adapted to bear against said seat, means connected to said head to cause it to bear against said seat, and means extending without the tank whereby to unseat said valve-head.

GEORGE W. WATTS.